I. HECHENBLEIKNER AND T. C. OLIVER.
METHOD OF TREATING SLUDGE ACIDS.
APPLICATION FILED JAN. 25, 1922.
1,423,766.  Patented July 25, 1922.
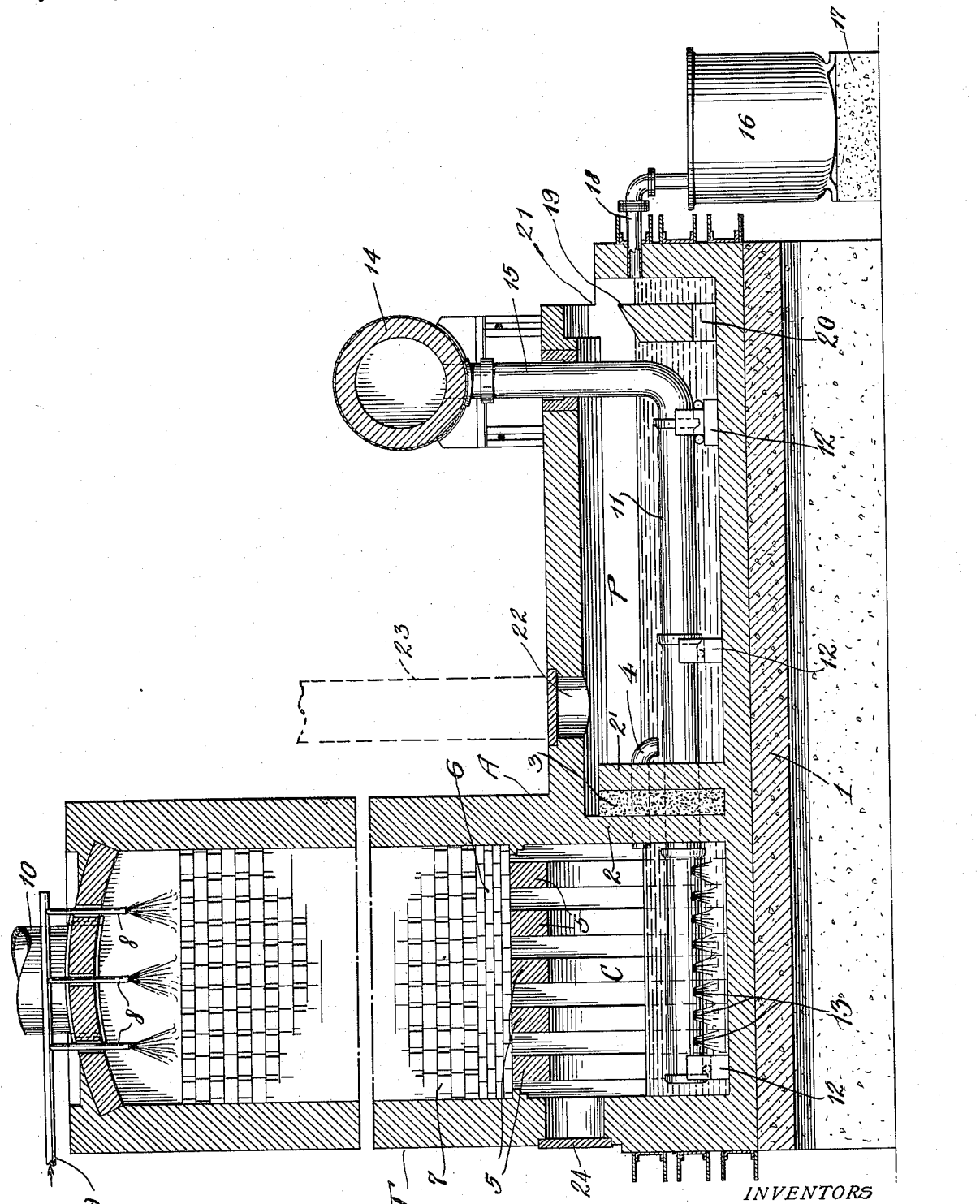
INVENTORS
INGENUIN HECHENBLEIKNER
and THOMAS C. OLIVER
BY Meyers, Cavanagh & Whitehead
ATTORNEYS

UNITED STATES PATENT OFFICE.

INGENUIN HECHENBLEIKNER AND THOMAS C. OLIVER, OF CHARLOTTE, NORTH CAROLINA, ASSIGNORS TO CHEMICAL CONSTRUCTION COMPANY, OF NEW YORK, N. Y., A CORPORATION OF NORTH CAROLINA.

METHOD OF TREATING SLUDGE ACIDS.

1,423,766.   Specification of Letters Patent.   Patented July 25, 1922.

Application filed January 25, 1922. Serial No. 531,604.

*To all whom it may concern:*

Be it known that we, INGENUIN HECHENBLEIKNER and THOMAS C. OLIVER, citizens of the United States, and residents of Charlotte, in the county of Mecklenburg and State of North Carolina, have invented certain new and useful Improvements in Methods of Treating Sludge Acids, of which the following is a specification.

This invention relates to a method of treating sludge acids or separated sludge acids obtained in the refining of mineral oils and relates more particularly to the concentration and purifying of the sludge acids; and has special reference to the provision of a method of treating sludge acids having a high percentage of cokey, tarry and asphaltic matter therein.

As is well known, crude petroleum oil or its fractional distillates is refined by subjecting the same to the action of sulphuric acid so that the latter will absorb the heavy hydrocarbons and other undesirable elements present in the crude oil. In practice, the sulphuric acid so used has an initial strength of about 66 degrees Baumé or stronger, but at the completion of the operation and after the refined oil has been separated there remains a sludge or waste or spent acid which not only contains the impurities removed from the oil, but is also of a reduced strength, due to the fact that the acid has absorbed a certain amount of water during the refining process. This sludge acid is generally then subjected to further dilution with steam and water in the operation of recovering such oil as may remain therein and for the purpose of relieving the acid as much as possible of its absorbed impurities. This secondary treatment results in further diluting the acid usually to about 30 degrees Baumé. Some acids and notably those obtained in the treatment of the more asphaltic base oils such, for example, as the California oils, the sludge acid is separated in this last step and reduced to a strength of about 46 to 48 degrees Baumé. Acids obtained in the treatment of these more asphaltic base oils contain an unusual percentage of cokey and tarry substances. Some of the acids which are separated to 30 degrees Baumé and even lower have also been found to contain an unusual amount of carbon impurities, depending upon the manner in which they are used in the refining process and the manner in which they are separated from the sludge oils, some of such acids containing as high as ten per cent impurities. The present invention relates particularly to the reclaiming of sludge acids having a high degree or percentage of carbonaceous impurities.

The reclaiming or salvaging of the sludge acids has been found difficult of attainment in prior sludge recovery methods. The acids contain a high percentage of carbon and in the reclaiming of the acid in the conventional systems the carbon is oxidized at the temperatures employed and the sulphuric acid is broken down to sulfurous acid, thus resulting in considerable losses of the acid which it is desired to reclaim. In a method invented by us and described in co-pending application, Serial No. 477,936 of June 16, 1921, we disclose the treatment of the sludge acids or separated sludge acids in two stages, a bath of the acid being heated and agitated in the first stage by bubbling hot air or hot gases therethrough and concentrating the said bath to an intermediate strength and preferably below the charring or foaming point of the acid with considerable impurities removed in this stage, the partially concentrated acid being then heated in a second stage for completing the concentration thereof. In the practice of this method for acids having a very high degree or percentage of coke, tar or asphalts therein, we have found that the coke, asphalts and tars are not readily removed in the low or first stage intensely agitated body, the boiling point of these carbon impurities being too high to be economically treated in this low temperature agitated stage. We have further found that these high boiling point tars, cokes and asphalts are difficult of removal in the second or high concentrating stage, it having been found that the cokey, tarry and asphaltic matter when so treated in the second stage at high temperatures and concentrations fail to separate out in large particles and attain a finely divided condition in suspension in the acid, these impurities being therefore relatively difficult of removal in this second stage.

After considerable experimentation as to the most economical and efficient treatment of these sludge acids we have discovered that if the acid is heated at an intermediate stage without agitation and heated at intermediate temperatures, that the cokey, tarry and asphaltic material will separate out in relatively large particles and lumps and will float to the surface of the acid in the form of coke and tar compounds and will thus be rendered in a condition easy of removal from the body of acid, the impurities being removable either automatically or by skimming. This renders the acid partially purified and ready for further concentration purposes in a very economical manner.

The principal objects of our present invention may be said to include, besides the provision of a method of treating sludge acids accomplishing the results above referred to, the further provision of a method of treating sludge acids in which the treatment of the acid is divided into two stages with concentration of the acid taking place in the first stage up to an intermediate point; and completion of the concentration taking place at the second stage, with the first stage subdivided into two steps, the acid being heated and agitated for concentration purposes in the first step and heated at a higher temperature without agitation in the second step and substantially without concentration in such second step, the tarry and asphaltic substances being eliminated in this second step; and the further provision of a method in which the acids having a high degree or percentage of tarry and asphaltic matter may be reclaimed with greater rapidity, economy, efficiency and convenience than is possible by previously known methods and equipment.

To the accomplishment of the foregoing and such other objects as may hereinafter appear, our invention consists in the method and the various steps as hereinafter particularly described and sought to be defined in the claims, reference being had to the accompanying drawings, in which—

The figure is a cross sectional view of the apparatus we prefer to use in the carrying out of our method.

In the practice of our method the weak sludge acid is first collected in a body or bath and is heated and agitated to effect a partial concentration thereof, this heating and agitating being carried out by means of bubbling hot air or hot gases through the body of acid. The hot air or hot gases issuing or exiting from the bath of acid is or are utilized for preheating the weak acid fed into the bath, a preheating tower being provided for this purpose. The acid in the bath is concentrated up to an intermediate strength and preferably up to or below the foaming point of the said acid, the concentration of the acid taking place at temperatures substantially below the true boiling point thereof. During this heating step of the bath considerable of the impurities in the acid are eliminated, and in the preheating step in the tower the higher hydrocarbons and the $SO_2$ content in the acid are eliminated. The heavier hydrocarbons such as the high boiling point cokey, tarry and asphaltic matter, however, are not efficiently removed in these steps and for the economical removal of these substances the acid, after being concentrated in the said bath, is caused to flow in a second bath arranged preferably adjacent to the first bath, and the said acid is here treated for the effective removal of the tarry and asphaltic matter. In this second bath the acid is subjected to a high degree of heat, preferably in a static or quiescent condition, this second bath being heated to a temperature higher than the temperature of the first bath and the acid may here be heated at or near its true boiling point. This latter heating step is preferably carried out substantially without effecting any further concentration in the acid, although some concentration may here take place, this step being substantially a purifying step. During this latter treatment the tarry and asphaltic bodies separate from the acid in relatively large particles and float on the surface of the bath, these bodies being removed mechanically or by skimming, leaving the body of acid in a relatively purified state. The purified acid is then further treated in a second stage for concentrating the same to its original strength of about 66 degrees Baumé.

As examples of this method we may cite the following:

Example 1: The weak acid of about 46 to 48 degrees Baumé is fed into the first bath and there concentrated to, say, about 57 degrees Baumé. For effecting this concentration the first bath of the acid is maintained at about 270 degrees F., the temperature of the acid being controlled by regulating the quantity of incoming weak feed acid. This partially concentrated acid then flows into an adjacent bath and is heated to a higher temperature and if desired to the true boiling point of the acid which at this concentration is about 360 degrees F. While the acid in this latter treatment undergoes little change and may lose a little of its specific density, the cokey and tarry contents undergo a tremendous physical change in separating in relatively large particles and rise to the surface for removal. The 57 degree Baumé acid is then treated in a second stage to concentrate the same to about 66 degrees Baumé.

Example 2: Assuming it is desired to concentrate the acid in the first stage up to about 51 degrees Baumé, the temperature in the first bath is maintained at 240 degrees F. and the temperature in the second bath is maintained at about 300 degrees F. In the latter bath the tarry and asphaltic matter will be separated and will rise to the surface in a condition to be skimmed. The 51 degree Baumé acid is then removed from the said latter bath and is treated in a second stage for effecting the completion of the concentration thereof.

Referring now to the drawings, in which we show an apparatus we prefer to use in carrying out our first stage of the process, we show the acid recovery plant A supported on a foundation 1 which may be of any suitable character and is preferably constructed of concrete or similar material, reinforced if deemed desirable. The acid recovery plant A, which may be constructed of any suitable acid-proof material such as acid resisting silicate bricks laid in acid-proof mortar, is divided into two sections or compartments C and P by means of the transverse partition or baffle walls 2 and 2' having therebetween an intermediate layer 3 preferably of sand. For the purpose of affording communication between the sections or compartments C and P, we provide a plurality of ports 4, one of which is shown in the drawings, the acid passing from the compartment C which is the concentrating section, to the compartment P, which is the purifying section, these ports being preferably located a slight distance below the normal level of the acid.

The concentrating section C of the plant communicates with a tower T which may be about 25 feet in height and this tower may be of any well known construction and in the present instance is provided at its lower portion with spaced arches 5 of acid-proof brick set in acid-proof cement and designed to support a bridge 6 composed of parallel rows of bricks, the bridge in turn sustaining the brick checker-work 7, which is packed as loosely as possible. At its top the tower is provided with the usual acid spray inlet pipes 8 communicating with a manifold 9 and an outlet flue 10, preferably made of lead, the latter functioning for conducting the spent gases outwardly from the tower T. The weak acid to be concentrated and purified is introduced into the top of the tower through the acid inlet pipes 8, the acid being admitted in a spray into the tower T, the weak acid trickling down over and through the packing and checker-work and feeding into the concentrating section C of the plant.

In order to internally heat the acid for the purpose of concentrating and purifying the same, we employ a suitable heater and in the present instance such heater comprises a plurality of parallel horizontally disposed pipes 11, one of which is shown in the figure, these pipes being also of acid-resisting material and extending substantially the length of the compartments C and P, the pipes being supported in the baffle walls 2 and 2' and by means of a plurality of spaced piers 12. In the concentrating compartment or chamber C the pipes 11 are provided with a plurality of spaced perforations 13 forming ports for the escape of hot air or hot gas conducted through the said pipes under pressure. In the purifying compartment P the pipes are continuous with preferably no perforations provided therein, the gases flowing through these pipes functioning merely to heat the body of acid in the purifying compartment P without subjecting the acid to agitation. For conducting the hot gases to the pipes 11 we preferably provide a manifold 14 connected to a suitable source of heat supply such as a furnace (not shown), this manifold preferably extending transversely above the purifying chamber P and being connected with the outer end portion of each heater pipe by means of a vertical branch pipe 15, these branch pipes preferably extending down through the roof of the chamber P. The supply of heated gases to the pipes 11 may be suitably controlled by any desirable means such as a suitable valve (not shown).

In the practice of our method and the use of our apparatus the hot air or gases are conducted through the pipes 11, the acid bath in the compartment P being highly heated by the gases flowing through these pipes, with the acid in a quiescent state, the gases exiting from the ports 13 into the bath of acid in the concentrating chamber C, the hot gases bubbling through the acid in the said concentrating chamber and effecting a concentration thereof. The spent gases move up through the tower T and preheat the incoming weak feed acid distributed by means of the pipes 8. The preheating in the tower T is carried on to an extent to sufficiently preheat the incoming acid to drive off the more volatile impurities therein such as the higher hydrocarbons and the $SO_2$ content, the preheated acid collecting in the bath in the concentrating chamber C, the heating and concentration in this chamber being carried on sufficiently to drive off considerable of the impurities in the acid, concentration being effected to an intermediate strength and preferably below the foaming point of the acid. This concentration may be, for example, within the range of 47 to 60 degrees Baumé. The partially concentrated acid then flows through the ports 4 into the purifying chamber P, the acid being highly heated here in a quiescent condition up to its true boiling point substantially without further concentrating the same. When treated in the chamber P the tarry and cokey matter in the acid float to the surface in a condition to be skimmed or otherwise removed therefrom.

The acid, after being so treated, is then removed to coolers such as 16 mounted on piers 17, the coolers communicating with the purifying chamber P by means of piping 18. For the purpose of preventing the tarry and cokey compounds from exiting through the piping 18 the trap wall 19 is preferably provided, the latter being channeled at its bottom as at 20 to permit the acid to flow for withdrawal through the piping 18. The floating impurities may be removed through the opening 21 provided in the chamber P. The purifying chamber P is preferably provided with a manhole 22, and if desired, an outlet flue 23 indicated in dotted lines in the figure may be provided communicating with this manhole. A second manhole 24 normally closed may be provided for the concentrating chamber C. With the provision of this means the tarry and cokey impurities may be skimmed and otherwise removed from the partially concentrated acid and the acid may be collected for further treatment in the further concentrating step.

After effecting the partial concentration and the purification of the acid in this apparatus the acid then undergoes further treatment, preferably in a manner similar to the treatment in the concentrating compartment C, the temperatures being so controlled as to effect concentration of the acid preferably up to 66 degrees Baumé.

The practice of our process and the use of our apparatus will, in the main, be apparent from the above detailed description thereof. It will be further apparent that we have provided a novel method especially adapted for the concentrating and purifying of acids heavily charged with the lower hydrocarbons, the reclaiming of the acid being carried on by our process in a very economical manner.

While we have shown our apparatus and described our method in the preferred form and manner, it will be obvious that many changes and modifications may be made without departing from the spirit of the invention, defined in the following claims.

We claim:

1. The method of treating sludge acids or separated sludge acids which consists in heating and agitating a weak sludge acid thereby effecting a partial concentration thereof, in then heating the partially concentrated acid without agitation at a higher temperature and in then heating the so treated acid to effect further concentration thereof.

2. The method of treating sludge acids or separated sludge acids which consists in heating and agitating a weak sludge acid thereby effecting a partial concentration thereof and in then heating the partially concentrated acid without agitation at a higher temperature and substantially without concentrating the same and in then heating the so treated acid to effect further concentration thereof.

3. The method of treating sludge acids or separated sludge acids which consists in heating and agitating a body of weak sludge acid thereby effecting a partial concentration thereof, in then heating a body of the partially concentrated acid without agitation at a higher temperature and in then heating the so treated acid to effect further concentration thereof.

4. The method of treating sludge acids or separated sludge acids which consists in heating and agitating a weak sludge acid to effect a partial concentration thereof to from 47 to 60 degrees Baumé, in then heating the partially concentrated acid without agitation at a higher temperature and in then heating the so treated acid to effect further concentration thereof to about 66 degrees Baumé.

5. The method of treating sludge acids or separated sludge acids which consists in bubbling hot air or gases through a body of weak sludge acid heating and agitating the same to effect a partial concentration thereof, in then heating the partially concentrated acid without agitation to a higher temperature and in then heating the so treated acid to effect further concentration thereof.

6. The method of treating sludge acids or separated sludge acids which consists in bubbling hot air or gases through a body of weak sludge acid thereby heating and agitating the same to effect a partial concentration thereof, in then heating a body of the partially concentrated acid without agitation and substantially without concentrating the same and in then heating the so treated acid to effect further concentration thereof.

7. The method of treating sludge acids or separated sludge acids which consists in bubbling hot air or hot gases through a body of the weak sludge acid thereby heating and agitating the same, in then conducting hot air or hot gas under pressure through a conduit passing through a body of the said partially concentrated acid to heat the same substantially without concentrating the same and in thereafter heating the so treated acid to effect further concentration thereof.

8. The method of treating sludge acids or separated sludge acids which consists in feeding a weak sludge acid into a bath of the same while preheating the same, in heating and agitating the bath to effect a partial concentration of the acid, in then heating the partially concentrated acid at a higher temperature without agitation and in thereafter heating the so treated acid to effect further concentration thereof.

9. The method of treating sludge acids or separated sludge acids which consists in feeding a weak sludge acid into a bath of the acid, in bubbling hot air or gases through the bath of acid heating and agitating the same, in preheating the weak acid fed into the bath by means of the spent hot air or gases exiting from the bath, in then heating the partially concentrated acid without agitation and in thereafter heating the so treated acid to effect further concentration thereof.

10. The steps in the method of treating sludge acids or separated sludge acids which consist in heating and agitating a weak sludge acid thereby concentrating the same to an intermediate strength and in then heating the said partially concentrated acid without agitation at a higher temperature.

11. The steps in the method of treating sludge acids or separated sludge acids which consist in heating and agitating a weak sludge acid thereby concentrating the same to an intermediate strength and in then heating the said partially concentrated acid without agitation at a higher temperature substantially without concentrating the same.

12. The steps in the method of treating sludge acids or separated sludge acids which consist in heating and agitating a body of weak sludge acid thereby concentrating the same to an intermediate strength and in then heating the said partially concentrated acid without agitation at a higher temperature.

13. The steps in the method of treating sludge acids or separated sludge acids which consist in bubbling hot air or hot gases through a body of weak sludge acid thereby concentrating the same to an intermediate strength and in heating the said partially concentrated acid without agitation at a higher temperature.

14. The steps in the method of treating sludge acids or separated sludge acids which consist in bubbling hot air or hot gases through a bath of the acid thereby concentrating the same to an intermediate strength, in then heating a bath of the said partially concentrated acid without agitation at a higher temperature to cause the impurities therein to float in the said bath and in removing the impurities from the said bath.

15. The steps in the method of treating sludge acids or separated sludge acids which consist in feeding a weak acid into a bath of acid, in bubbling hot air or hot gases through the said bath to concentrate the acid to an intermediate strength, the hot air or hot gases preheating the weak acid fed into the bath and in heating the said partially concentrated acid without agitation at a higher temperature to cause the impurities to float therein and in then removing the impurities therefrom.

16. The steps in the method of treating sludge acids or separated sludge acids which consist in heating and agitating sludge acid to concentrate the same to an intermediate strength of from 47 to 60 degrees Baumé and in then heating the said partially concentrated acid without agitation and substantially without further concentration at a higher temperature to effect the removal of impurities therein.

17. The steps in the method of treating sludge acids or separated sludge acids which consist in bubbling hot air or hot gases through a body of sludge acid to concentrate the same to an intermediate strength of about 47 to 60 degrees Baumé and in then heating the said partially concentrated acid by conducting hot gases through the same without agitation and without substantially concentrating the same to effect the removal of the impurities therein.

18. The method of treating sludge acid or separated sludge acid which consists in heating and agitating a weak sludge acid thereby effecting a partial concentration thereof at temperatures substantially below the boiling point of the acid, in then heating the partially concentrated acid at a higher temperature and close to the boiling point of the acid to cause the impurities therein to float to the surface and in removing the said impurities.

19. The method of treating sludge acid or separated sludge acid which consists in bubbling hot air or gases through a weak sludge acid thereby effecting a partial concentration thereof at temperatures substantially below the boiling point of the acid, in then heating the partially concentrated acid at a higher temperature and close to the boiling point of the acid substantially without concentrating the same to cause the impurities therein to float to the surface and in removing the said impurities.

20. The method of treating sludge acid or separated sludge acid which consists in heating and agitating a weak sludge acid thereby effecting a partial concentration thereof at temperatures substantially below the boiling point of the acid, in then heating the partially concentrated acid at a higher temperature and close to the boiling point of the acid to cause the impurities therein to float to the surface, in removing the said impurities and in then heating the acid so treated to effect completion of concentration thereof.

Signed at New York city, in the county of New York and State of New York, this 11th day of January, A. D. 1922.

INGENUIN HECHENBLEIKNER.
THOMAS C. OLIVER